(12) United States Patent
Bard et al.

(10) Patent No.: US 7,985,021 B2
(45) Date of Patent: Jul. 26, 2011

(54) PROBE (75) Inventors: Oliver Bard, Falkensee (DE); Bernhard Ostrick, Berlin (DE)

(73) Assignee: EPCOS AG, Munich (DE)

( * ) Notice: Subject to any disclaimer, the term of this patent is extended or adjusted under 35 U.S.C. 154(b) by 325 days.

(21) Appl. No.: 12/279,417

(22) PCT Filed: Feb. 14, 2007

(86) PCT No.: PCT/DE2007/000256
§ 371 (c)(1),
(2), (4) Date: Sep. 5, 2008

(87) PCT Pub. No.: WO2007/093156
PCT Pub. Date: Aug. 23, 2007

(65) Prior Publication Data
US 2009/0207878 A1 Aug. 20, 2009

(30) Foreign Application Priority Data

Feb. 15, 2006 (DE) .................. 10 2006 007 219
May 9, 2006 (DE) .................. 10 2006 021 528

(51) Int. Cl.
*G01K 13/02* (2006.01)
*G01K 1/00* (2006.01)
*G01K 7/00* (2006.01)

(52) U.S. Cl. ......... 374/138; 374/208; 374/163; 374/148

(58) Field of Classification Search .................. 374/116, 374/138, 208, 135, 148, 163
See application file for complete search history.

(56) References Cited

U.S. PATENT DOCUMENTS

| | | | | |
|---|---|---|---|---|
| 2,496,806 A | * | 2/1950 | Moffatt | 136/224 |
| 2,820,839 A | * | 1/1958 | Schunke | 136/231 |
| 3,623,367 A | | 11/1971 | Benedict | |
| 4,265,115 A | | 5/1981 | Stuhr | |
| 5,348,395 A | * | 9/1994 | Corr et al. | 374/135 |
| 7,553,079 B1 | * | 6/2009 | Khan et al. | 374/208 |
| 2002/0163954 A1 | * | 11/2002 | Park et al. | 374/185 |
| 2004/0261552 A1 | | 12/2004 | Grundmann et al. | |
| 2005/0155408 A1 | | 7/2005 | Weyl et al. | |
| 2008/0031709 A1 | * | 2/2008 | Bonora et al. | 374/115 |

FOREIGN PATENT DOCUMENTS

| | | |
|---|---|---|
| DE | 2157029 | 5/1973 |
| DE | 2549619 | 5/1977 |
| DE | 19504572 | 8/1996 |
| DE | 10159869 | 6/2003 |
| DE | 10256801 | 7/2004 |

(Continued)

OTHER PUBLICATIONS

Search report dated Sep. 28, 2009 from corresponding EP application 07721916.0.

(Continued)

*Primary Examiner* — Lisa M Caputo
*Assistant Examiner* — Mirellys Jagan
(74) *Attorney, Agent, or Firm* — Fish & Richardson P.C.

(57) ABSTRACT

A probe includes a sensing element and a carrier for the sensing element. The carrier has an integrated device for guiding an air stream to the sensing element, and a long axis perpendicular to a plane defined by the flow direction of the air stream. The probe is substantially symmetric with respect to the plane.

17 Claims, 6 Drawing Sheets

FOREIGN PATENT DOCUMENTS

| | | |
|---|---|---|
| EP | 0726450 | 9/1996 |
| EP | 1435514 | 7/2004 |
| GB | 734702 | 8/1955 |
| GB | 739694 | 11/1955 |
| JP | 59-171823 | 9/1984 |
| WO | WO03/076920 | 9/2003 |

OTHER PUBLICATIONS

International Search Report and Written Opinion in Application No. PCT/DE2007/000256, dated Sep. 10, 2007.

International Preliminary Report on Patentability in Application No. PCT/DE2007/000256, dated Sep. 9, 2008.

\* cited by examiner

PROBE

CROSS REFERENCE TO RELATED APPLICATIONS

Pursuant to 35 USC §120, this application claims the benefit PCT/DE2007/000256 filed Feb. 14, 2007 which claims the benefit of German Patent Application No. 102006007219.7 filed Feb. 15, 2006 and German Patent Application No. 102006021528.1 dated May 9, 2006. Each of these applications is incorporated by reference in its entirety.

BACKGROUND

A probe is described that can be used for temperature measurement, for example. A temperature probe is known from the publications EP 1435514 A2, JP 59171823 A, DE 10159869 A1, DE 2549619 A1, U.S. Pat. No. 3,623,367, DE OS 2157029, GB 739694 and U.S. Pat. No. 4,265,115.

One problem to be solved is to specify a probe that is suitable for measuring physical parameters of an air stream.

SUMMARY

A probe is specified with a sensing element and a carrier for the sensing element, wherein the carrier has a device for guiding an air stream to the sensing element.

Although only air was mentioned as a flowing medium, the probe can be used for an arbitrary flowing medium, i.e., gas or liquid.

The sensing element is preferably suitable for temperature detection. The sensing element can be, for example, an unencapsulated or an encapsulated NTC element. NTC stands for Negative Temperature Coefficient. Additional temperature sensors can be considered.

Since the sensing element is preferably a point sensor, a possible temperature integration by means of the device for guiding an air stream is particularly advantageous for applications, such as air conditioners, that generate air stream components with different temperatures.

The sensing element can also be suitable, however, for measuring the moisture content or the content of a component of an air stream that is to be monitored.

The probe and the carrier in particular, is preferably formed mirror-symmetrically with respect to a plane that is arranged perpendicular to the direction of flow and in which the longitudinal axis of the carrier lies. In this case, the probe has the same properties relative to the flow conditions when the direction of flow is reversed. A mirror-symmetric arrangement of the probe is advantageous particularly if two probes are arranged on different sides of an external carrier, e.g., at the driver's seat and at the passenger's seat for an automobile heater.

It is considered an advantage for the sensing element to not be directly contacted by the flow. The air stream can therefore be shielded by at least one shielding device at the air intake. The shielding device contributes to the deflection of the air stream.

The sensing element can be shielded by a shield, e.g., a shielding surface oriented perpendicular to the direction of flow, so that the air stream is not directly incident on it. The linear cross-sectional dimension or width of the shielding device measured perpendicular to the direction of flow of the input stream is preferably greater overall, i.e., for each place in the vertical direction, than the linear cross-sectional dimension or width of the sensing element measured in this direction.

Preferred embodiments of the probe will be further described.

The temperature is preferably integrated inside the probe over as large as possible an area of the air flow, or over different, mutually separated or interconnected areas. The flow components are preferably collected over a large total area. The air channel formed in the probe in order to direct the air flow can comprise a constriction in the vicinity of the sensing element so that components of the air flow that are collected over a large area can be mixed in the thus-formed constriction and measured with respect to their average temperature. Therefore an averaging of the temperature takes place for a nonhomogeneous temperature distribution in the entering air stream.

The device for guiding the air stream directs the air stream to the sensing element. The original direction of flow is preferably changed by guidance or deflection. For this purpose, an open channel, a closed channel, and/or deflection surfaces by which the flow direction is redirected are particularly suitable.

A closed channel is understood to mean a cavity that is accessible to the air stream by inlet and outlet openings but in cross section is surrounded on all sides by exterior walls of the carrier. An open channel represents a depression (groove), extended in a preferred direction, that is formed in an outer wall of the carrier.

The device for guiding the air stream preferably comprises an air reservoir that is suitable for mixing various components of the air stream having physical parameters, such as temperature, that differ from one another. The device for guiding the air stream is preferably suitable for temperature integration of the air stream.

The device for guiding the air stream can have at least one constriction of the cross section, which is advantageous with regard to the mixing of stream components.

The device for guiding the air stream can have at least one groove that runs on an exterior side of the carrier. The device for guiding the air stream can also comprise a channel with an open first area and a closed second area.

The device for guiding the air stream preferably has an air inlet and an air outlet, which in one variant each comprise at least one opening or nozzle. The air inlet or outlet can also comprise several openings for passage of the air stream.

In one variant, a negative pressure is generated at the air outlets by means, for instance, of suction pressure or dynamic pressure.

The air stream is preferably deflected by the device for guiding the air stream. For example, a surface that is inclined relative to a longitudinal direction of the carrier for forming a constriction of the air reservoir, among other things, is suitable for deflecting the air stream. This surface functions as an air stream reflector and is therefore called a reflector surface.

The air reservoir preferably has a cross section that tapers in the direction of flow, i.e., towards the sensing element. The minimum distance between the air inlet and the sensing element is preferably chosen to be as large as that between the sensing element and the air outlet. The minimum distance between the air inlet and the sensing element in another variant is chosen to be greater than that between the sensing element and the air outlet.

The reflector surface can be constructed as a funnel, in the bottom area of which an opening is preferably arranged. The sensing element is arranged in this opening. The air outlet is preferably arranged in the vicinity of this opening.

The longitudinal axis of the carrier is preferably oriented transverse to the flow direction of the incident air stream, i.e., perpendicular or inclined, not parallel. The carrier preferably comprises two boundary surfaces, between which the air reservoir is arranged, within which the air stream is conducted from the air input to the sensing element and on to the air outlet. The sensing element, the air inlet and outlet as well as the devices for guiding the air stream are arranged between these boundary surfaces. The boundary surfaces are preferably the main surfaces of the carrier.

The carrier is preferably constructed as a housing for the sensing element. An electrically insulating plastic is particularly suitable as a material for the carrier.

The carrier is preferably mounted at one end face on the holder in which the sensing element is retained in one variant. The sensing element can be contacted electrically by means of connection lines, which are preferably run through the holder and are led out to the end face of the carrier. The holder can comprise an electrical plug connection into which the connection lines of the sensing element are inserted and held by a tight fit.

The inlet and outlet openings are preferably formed in the lateral surface of the carrier. They can also be arranged in an end face of the carrier, however. The inlet openings are preferably arranged in a first end face and the sensing element at a second end face of the carrier. However, the sensing element can also be arranged in a central area of the housing.

The flow can be directed onto the sensing element from different sides to detect two substreams of the air stream. Accordingly, at least one first and at least one second inlet opening can be present in two mutually opposing sides (in cross section) of the carrier. The air outlet is preferably provided in common for both air streams.

In a preferred variant, the cross section of the air stream is as large at the inlet as at the outlet. In another variant, the device for guiding the air stream is constructed in such a manner, and the air inlet and outlet are positioned relative to this device in such a manner, that the cross section of the air stream is larger at the inlet than at the outlet For the mirror-symmetric construction of the probe, preferably at least two shielding surfaces are provided. Here at least one first shielding surface is arranged in the area of the inlet opening, and at least one second shielding surface is arranged in the area of the outlet opening The first and second shielding surfaces are formed mirror-symmetrically relative to one another.

The respective shielding surface can be formed, in particular, by a part, e.g. a side wall, of the carrier. The shielding device can additionally have two curved shielding surfaces, between which the sensing element is arranged. Additional shielding can be formed by the encapsulation of the sensing element.

In a preferred variant, all stream components that flow around the sensing element are deflected at least once. It is preferably true for each stream component that the path length of the stream component in the carrier, or in the device for guiding the air stream from the inlet opening to the sensing element, is greater than the minimum distance between the sensing element and the surface of the carrier. This distance is measured along the direction of the input stream.

Under certain circumstances, the air inlet can have several openings to decrease the entering air stream. These openings can be isolated from one another or can be connected to one another by at least one narrow gap. Shielding of the sensing element by a grid formed at the air inlet can also be considered.

The carrier preferably comprises at least one body that has a respective deflection surface both on the side of the air inlet and on the side of the air outlet. The body thus has two mirror-symmetric deflection surfaces running towards one another that are preferably curved.

The air channel is preferably relatively strongly constricted in the vicinity of the sensing element by the body of the carrier as well as by a base of the holder. The width of the air channel, measured in the longitudinal direction of the carrier and perpendicular to the input stream, is preferably at most twice the height of the air channel. The height of the air channel is equal to the distance between the main surfaces of the carrier.

The length of the constricted area of the air channel as measured in the direction of flow is determined by the minimum distance between the deflection surfaces as measured in this direction. This length is preferably at most twice the linear cross-sectional dimension of the sensing element.

A small length of the constricted area of the air channel has the advantage that width of the carrier as measured in the flow direction can be selected to be particularly small.

DESCRIPTION OF THE DRAWINGS

Advantageous embodiments will be explained with reference to schematic figures not drawn to scale. Therein.

DETAILED DESCRIPTION

Figure 1:
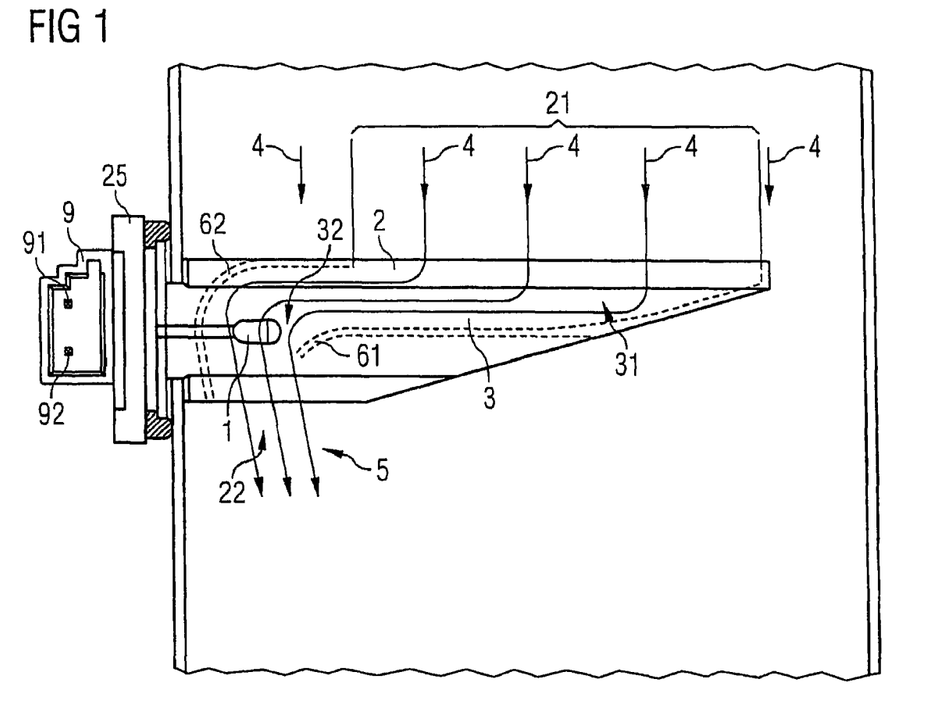
FIG. 1 shows a probe with an air guidance channel in cross section.

FIG. 1 shows a probe with a sensing element 1 and a housing that comprises a carrier 2 for sensing element 1. Carrier 2 is mounted at one end face on holder 25. Holder 25 preferably comprises a plug connection. It is also possible, however, for cables or connection lines, not shown in the figure, for contacting sensing element 1 to be led through holder 25.

The probe can be electrically contacted by means of a plug 9. Plug 9 serves for electrical connection between the probe and an external measuring circuit with which the current generated by the probe is detected and further processed. Plug 9 comprises contact elements 91, 92 for electrical contacting of connection lines of sensing element 1. The basic material of these contact elements preferably has a lower coefficient of thermal conductivity than the connection lines.

The housing comprises an air reservoir 3 that is arranged between the inside surface of carrier 2 and two deflection surfaces 61, 62. Deflection surfaces 61, 62 are curved.

Figure 2A:
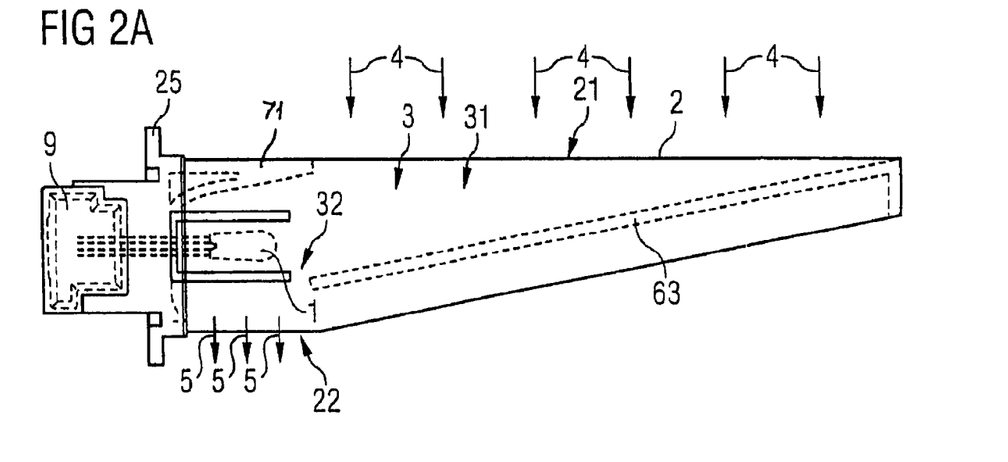
FIG. 2A, a probe in cross section, with a device for deflecting the air stream.
Figure 2B:
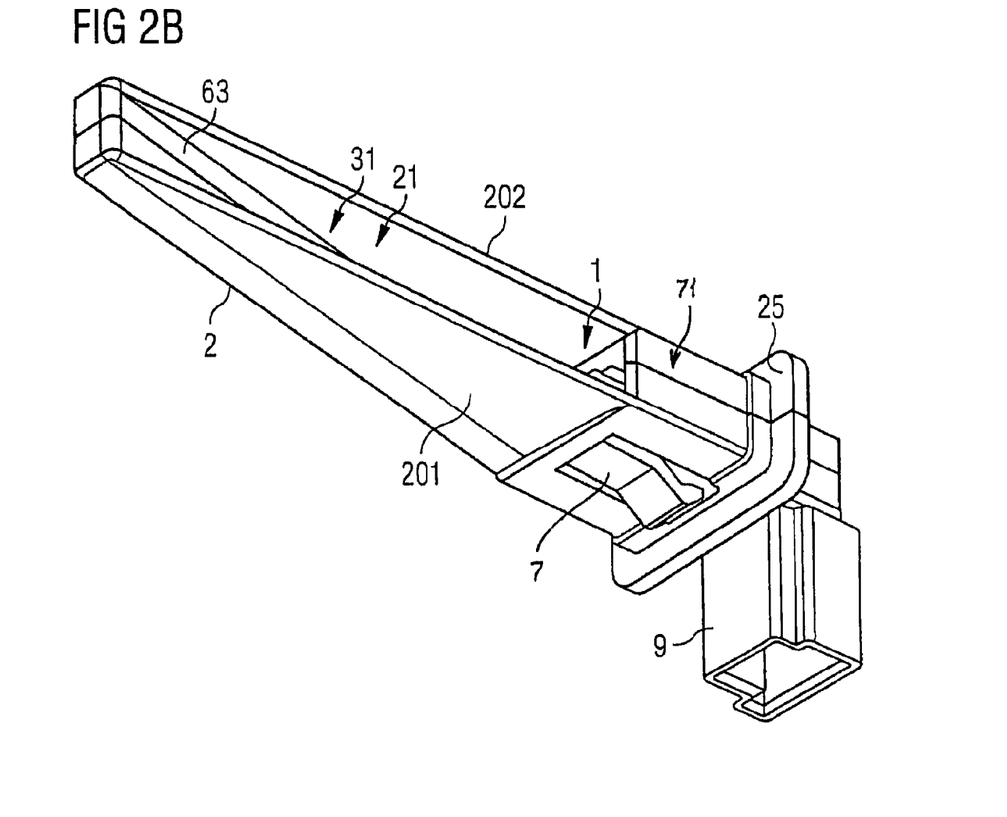
FIG. 2B, the probe according to FIG. 2A in a perspective view.

The incident air stream 4 penetrates into air reservoir 3 through an inlet opening 21 and leaves it through outlet opening 22. An additional view of the probe according to FIG. 2A is illustrated in FIG. 2B. Air reservoir 31 is constructed here as an open channel. The channel is formed by two guide surfaces 201, 202 of carrier 2 and by deflection surface 63. The open side of this channel forms inlet opening 21.

The direction of incident air stream 4 and that of exiting air stream 5 are indicated with respective arrows. Air reservoir 3 is suitable for mixing various components of the air stream that have mutually different temperatures at the air inlet.

Air reservoir 3 comprises an air guidance channel elongated in the longitudinal direction of the housing. Facing the inlet, air reservoir 3 has a collection area 31 in which the cross section of the air stream is relatively large. Different stream components are intermixed in collection area 31 and pass along further to a constriction area 32 that effects a narrowing of the cross section of the air stream. Sensing element 1 is arranged in the constriction area 32 in the vicinity of outlet opening 22.

In the variants according to FIGS. 1 and 2A, 2B, sensing element 1 is arranged in a peripheral area of the housing. In the variant according to FIG. 3, however, sensing element 1 is arranged in a central area of the housing, i.e., it faces away from the end faces of carrier 2 with respect to the longitudinal direction.

In the variant according to FIGS. 2A, 2B, a deflection surface 63 that is inclined relative to the longitudinal axis of carrier 2 is provided. The angle of inclination is preferably less than 45°.

The side surface of sensing element 1 is protected by a shield 71 from a direct flow of air.

Catch hook 7 serves to engage carrier 2 in a housing part of the application, for example.

In FIG. 2, the constriction of air reservoir 3 is formed between an edge of deflection surface 63 and shield 71.

Figure 3:
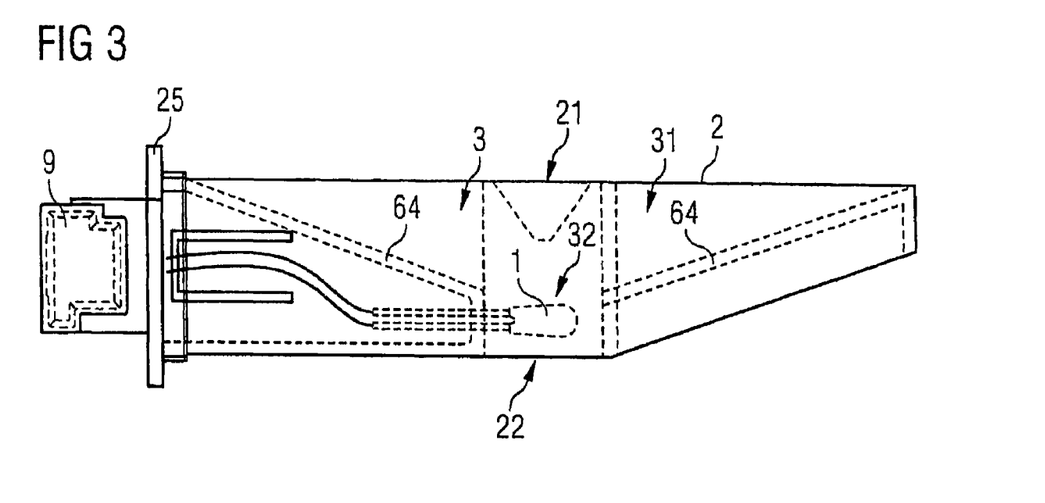
FIG. 3, a probe in cross section with a sensing element that is arranged in the bottom area of a funnel for deflecting the air stream, FIG. 4A, a probe in cross section, with interchangeable air inlet and air outlet and a constricted air channel, FIG. 4B, the probe according to FIG. 4A in a perspective view from below, FIG. 4C, an additional probe in cross section, with interchangeable air inlet and air outlet, FIG. 5A, a probe in cross section, with interchangeable air inlet and outlet and a sensing element placed in the center area of the carrier, and FIG. 5B, the probe according to FIG. 5A in a perspective view from below.

In the variant according to FIG. 3, a reflector surface is provided in the form of a funnel 64 with an opening in its bottom area in which sensing element 1 is arranged. As in FIG. 1, air reservoir 3 here is also narrowed towards sensing element 1.

FIGS. 4A, 4B, 4C and 5A, 5B each show a respective probe that is designed for a flow onto both sides of sensing element 1, for example for an air stream that runs parallel to boundary surfaces 201, 202. Air inlet 21a, 21b can be exchanged here for an air outlet 22a, 22b, and conversely. In this sense, it is particularly advantageous for the probe to be formed mirror-symmetrically with respect to a plane that is arranged perpendicular to the direction of flow and in which the longitudinal axis of the probe lies.

Figure 4A:
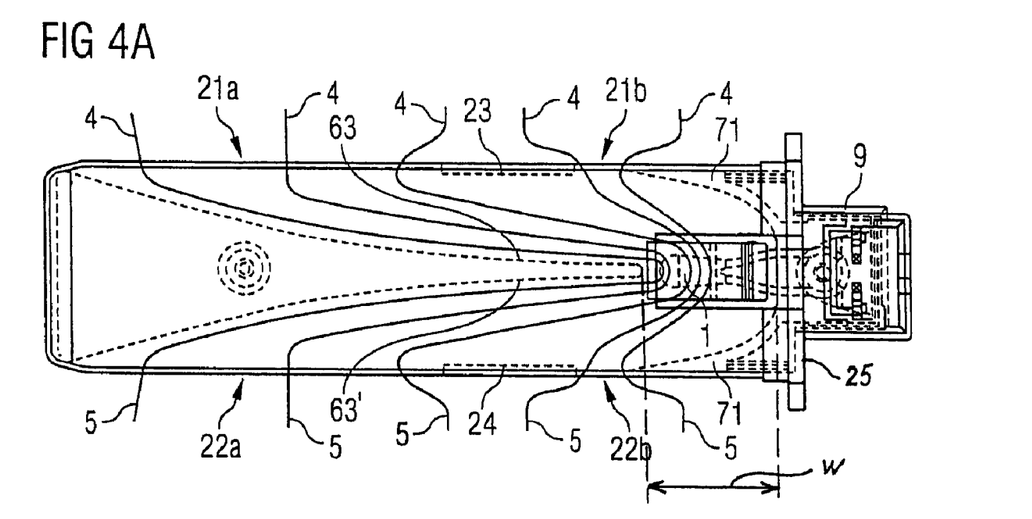
Figure 5A:
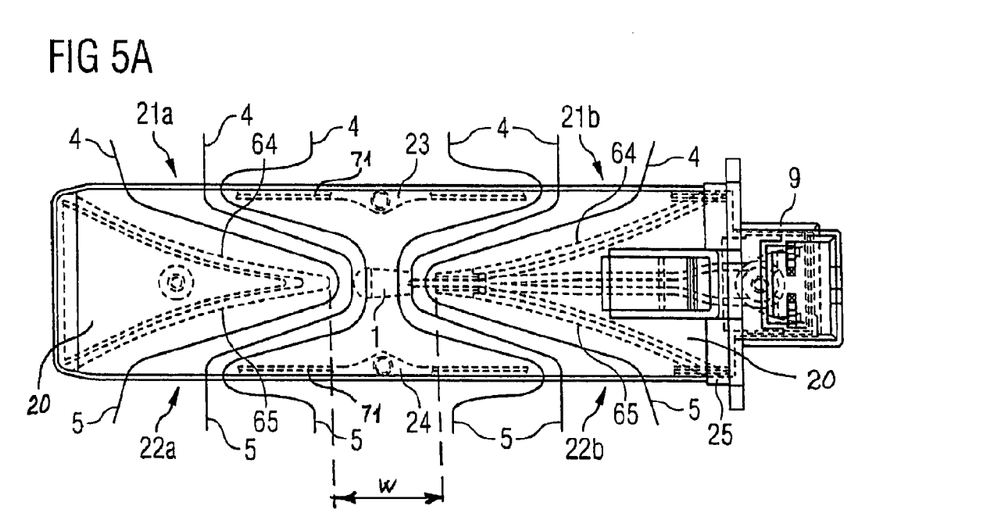

The arrangement of sensing element 1 in FIG. 4A corresponds to that in FIG. 2A. The arrangement of sensing element 1 in FIG. 5A substantially corresponds to that in FIG. 3. In contrast to the deflection surfaces shown in FIGS. 2A and 3, the deflection surfaces 63, 63', 64, 65 visible in FIGS. 4A and 5A are not flat, but are instead curved, e.g., parabolically or hyperbolically. Other surface designs commonly used for reflector surfaces can be considered.

The passage openings 21a, 21b or 22a, 22b, provided as air inlets depending on the direction of flow, are arranged such that as many components of the air stream to be analyzed as possible, i.e., a part of the air stream with a relatively large cross section, reach the air reservoir of the probe and are deflected in the direction of sensing element 1.

For modification, more particularly reduction, of the air stream to be diverted to sensing element 1, shielding surfaces 23, 24 are provided in the variants according to FIGS. 4A, 4B and 5A, 5B. Shielding surfaces 23, 24 make it possible to reduce the passage cross section of the entering air stream 3. Shielding surfaces 23, 24 present resistance to the air stream and cause, among other things, the deflection of the initially parallel components of the air stream, whereby mixing of the different stream components arises.

The entering air stream 4 is interrupted in a region by a shielding device such as shielding surface 23, 24, and is thereby mixed.

The greater part of the air stream is taken in by the probe according to FIG. 4A by the passage opening 21a or 22a, depending on the direction of the stream. In order to avoid pressure buildup of air in the area of sensing element 1, at least a small part of air stream 4, 5 is allowed to pass through close to this area. For this purpose, an opening 21b, 22b, smaller than opening 21a, 22a, is provided closest to sensing element 1.

All components of the air stream that enter into the air reservoir through the air inlets flow through the constriction area in which sensing element 1 is arranged. The constriction area is preferably offset relative to passage openings 21b, 22b in a projection plane that runs transverse to the direction of the stream.

For the probe according to FIG. 4A, shielding device 71 is formed with two reflector surfaces. The reflector surfaces prevent an air pressure buildup in the area of sensing element 1. Shielding device 71 is dimensioned such that it prevents a direct flow onto the sensing element. The stream path between sensing element 1 and the opening 21b, 22b closest to the sensing element is thereby lengthened.

Figure 4B:
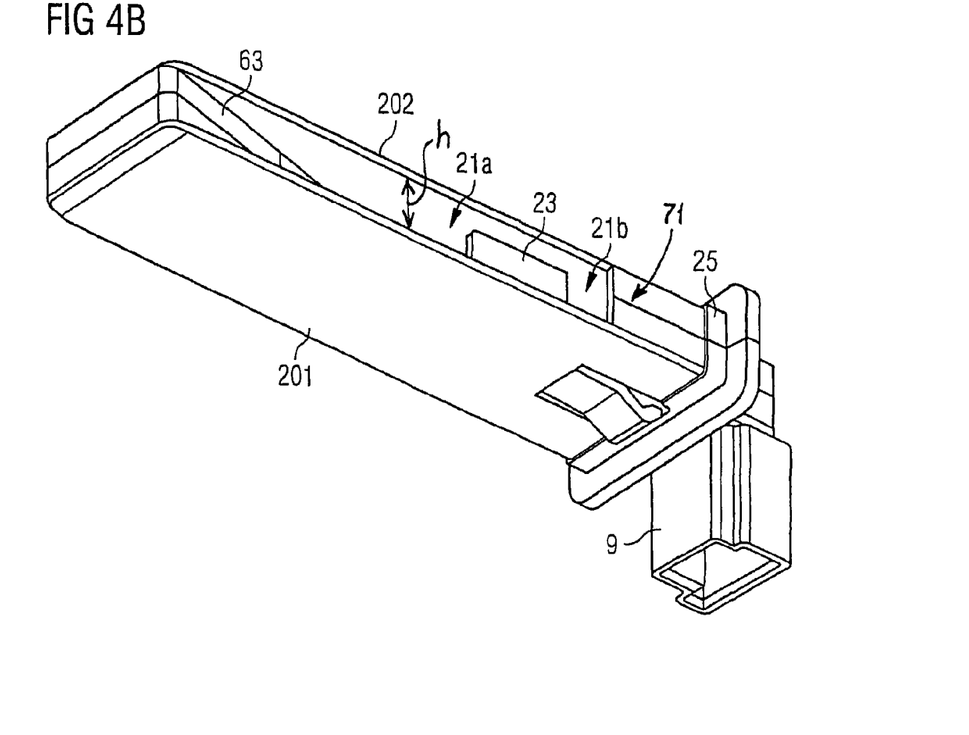
Figure 5B:
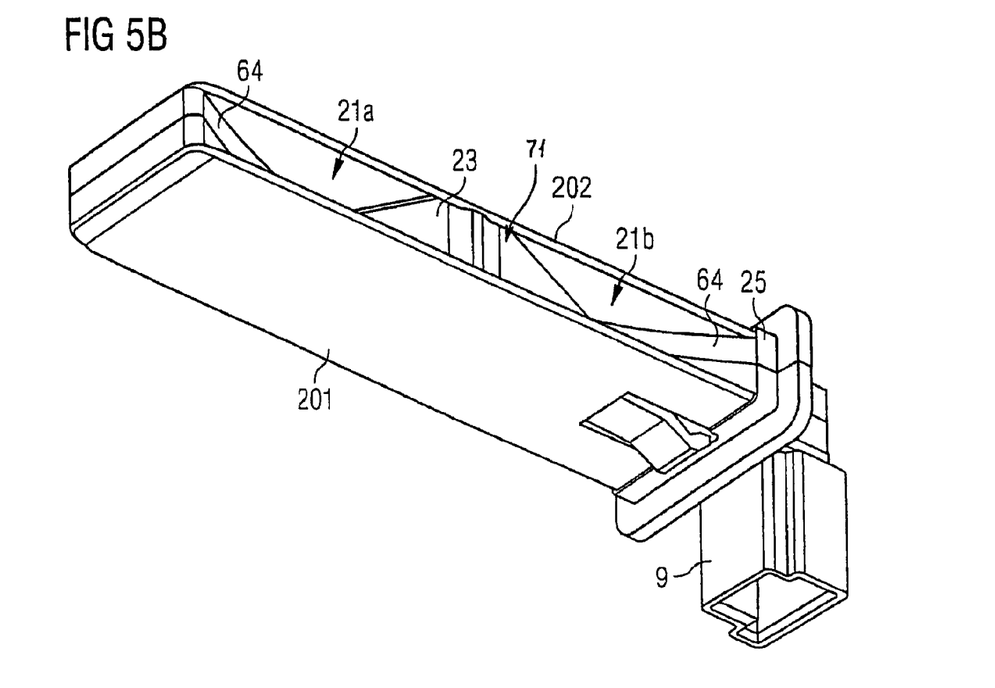

Openings 21a and 21b (as well as 22a and 22b) are connected to one another in FIGS. 4A, 4B, in contrast to FIGS. 5A, 5B, since shielding surface 23, 24 adjoins only lower boundary surface 201. Shielding surface 23, 24 is formed as a trapezoid in FIGS. 5A, 5B, and connects the two boundary surfaces 201, 202. The trapezoidal shape is optional here. Shielding surfaces 23, 24 can be designed in any desired manner, including in the form of a grid.

In case of at least two openings arranged on opposing sides of the carrier, e.g., openings 21a and 22a in FIG. 4A, each opening can be provided with deflection surface 63 and 63' of its own.

The air channel is relatively strongly constricted in the vicinity of sensing element 1 by a body 20 of the carrier having the curved deflection surfaces 63, 63' running towards one another, as well as by a base of shielding element 71. The width w of the air channel as measured in the longitudinal direction is preferably at most twice the height h of the air channel; see FIGS. 4A and 4B. The height h of the air channel is equal to the distance between the main surfaces 201, 202 of carrier 2.

Figure 4C:
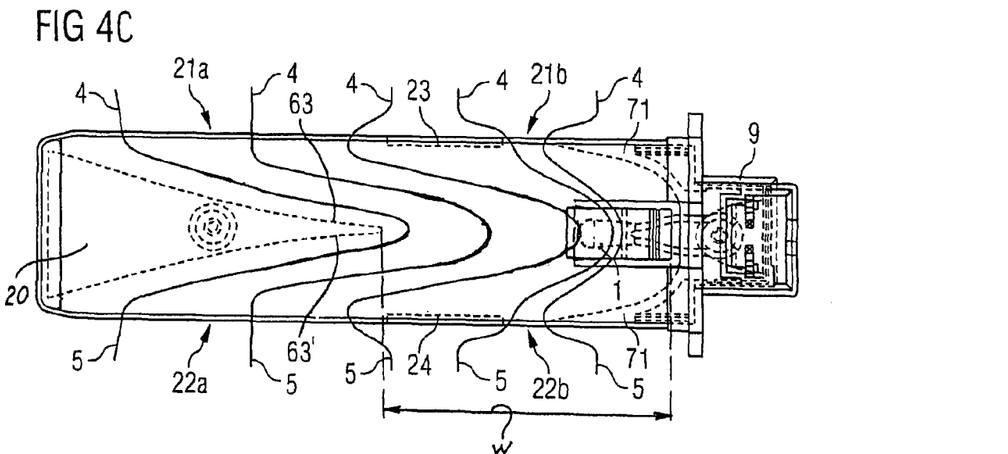

In principle, the width w of the air channel can, as in the variant illustrated in FIG. 4C, also be selected to be larger, insofar as sensing element 1 is sufficiently protected by shielding devices 23, 24 and 71 from an excessively strong air stream, and is protected, in particular, from a direct flow contact.

Deflection surfaces 63, 63' preferably run towards one another at an acute angle in the direction of sensing element 1.

The length of the constricted area of the air channel as measured in the direction of flow is determined by the minimum width of body 20 as measured in this direction, i.e., by the minimum distance between deflection surfaces 63, 63'. This length is preferably at most twice the linear cross-sectional dimension of sensing element 1.

If sensing element 1 is placed in the center area of carrier 2 as in FIG. 5A, each passage opening 21a, 21b, 22a, 22b suitable as an air inlet can be provided with a deflection surface 64, 65 of its own. In this case, two bodies 20 are provided with deflection surfaces 64, 65. The width w of the air channel constricted in the area of sensing elements 1 is determined in this case by the mutually facing ends of the two bodies 20. Three different possibilities for forming deflection surfaces 64, 65 or for adjusting the width w of the air channel in the area of sensing element 1 are indicated with dashed lines.

The characteristics described in conjunction with one of the variants are usable without restriction in the other variants. Design possibilities with respect to the shape of the elements of the probe that are shown are not limited to the examples shown.

The invention claimed is:

1. A probe comprising:
   a sensing element,
   a carrier for the sensing element, the carrier comprising an integrated device for guiding an air stream to the sensing element, the carrier having at least one first air inlet, comprising a first pass-through opening and at least one second air inlet comprising a second pass-through opening, the first and second pass-through openings being on opposite sides of the carrier, the carrier having a long axis perpendicular to a plane, the long axis being defined by the flow direction of the air stream,
   at least a first shield device transverse to the direction of the air stream at the first air inlet to constrict the incoming air stream,
   at least a second shield device transverse to the direction of the air stream at the second air inlet to constrict the exiting air stream,
   wherein the first and second shield devices are mirror-symmetric relative to the plane; and
   wherein the probe and the carrier are substantially mirror-symmetric with respect to the plane that is perpendicular to the long axis defined by the flow direction of the air stream such that the first pass-through opening and the second pass-through opening are disposed on opposite sides of the carrier in a mirror-symmetric arrangement relative to the plane that is perpendicular to the long axis defined by the flow direction of the air stream.

2. The probe of claim 1, wherein the sensing element is configured to measure temperature.

3. The probe of claim 1, wherein the air stream has a width in an area of the sensing element that, is at most twice a distance between main surfaces of the carrier.

4. The probe of claim 1, wherein the carrier comprises at least one body that comprises two mutually mirror-symmetric deflection surfaces, the cross section of the deflection surfaces extending towards the sensing element.

5. The probe of claim 1 wherein the probe is substantially mirror-symmetric with respect to the plane.

6. The probe of claim 1, wherein the device for guiding the air stream comprises at least one air inlet and at least one air outlet.

7. The probe of claim 6, wherein the device for guiding the air stream is configured to mix components of the air stream that have differing temperatures at the air inlet.

8. The probe of claim 1, wherein the device for guiding the air stream deflects the air stream in the direction of the sensing element.

9. The probe of claim 8, wherein the device for guiding the airstream further comprises one or more deflection surfaces configured to deflect the air stream the one or more deflection surfaces being inclined relative to a longitudinal direction of the carrier.

10. The probe of claim 1, wherein the sensing element further comprises a shielding device, the shielding device configured to shield the sensing element from a direct flow of the air stream.

11. The probe of claim 10, wherein a width of the shielding device transverse to the direction of a flow of an incoming stream is greater than a width of the sensing element transverse to the direction of the flow of the incoming air stream.

12. The probe of claim 1, wherein passage openings on opposing sides of the carrier act as air inlets.

13. The probe of claim 12, further comprising a device for guiding the air stream for each passage opening in the carrier, wherein the device deflects the air stream in the direction of the sensing element.

14. The probe of claim 1, wherein the device for guiding the air stream comprises an air reservoir.

15. The probe of claim 14, wherein the device for guiding the air stream comprises a groove on an outer surface of the carrier.

16. The probe of claim 14, wherein the air reservoir comprises a channel.

17. The probe of claim 16, wherein an incident air stream is deflected in the air reservoir.

* * * * *

UNITED STATES PATENT AND TRADEMARK OFFICE
CERTIFICATE OF CORRECTION

| | | |
|---|---|---|
| PATENT NO. | : 7,985,021 B2 | Page 1 of 1 |
| APPLICATION NO. | : 12/279417 | |
| DATED | : July 26, 2011 | |
| INVENTOR(S) | : Oliver Bard et al. | |

It is certified that error appears in the above-identified patent and that said Letters Patent is hereby corrected as shown below:

Column 7, Line 32 – delete "the probe and the carrier are" and insert -- the carrier is --, therefore.

Column 7, Line 43 – delete "that," and insert -- that --, therefore.

Column 8, Line 17 – delete "airstream" and insert -- air stream --, therefore.

Signed and Sealed this
Fourth Day of October, 2011

David J. Kappos
*Director of the United States Patent and Trademark Office*